United States Patent [19]
Shand

[11] Patent Number: 5,692,159
[45] Date of Patent: Nov. 25, 1997

US005692159A

[54] CONFIGURABLE DIGITAL SIGNAL INTERFACE USING FIELD PROGRAMMABLE GATE ARRAY TO REFORMAT DATA

[75] Inventor: Mark A. Shand, Palo Alto, Calif.

[73] Assignee: Digital Equipment Corporation, Maynard, Mass.

[21] Appl. No.: 444,453

[22] Filed: May 19, 1995

[51] Int. Cl.$^6$ .................................................. G06F 5/00
[52] U.S. Cl. ........................................................ 395/500
[58] Field of Search ........................... 395/200.2, 500, 395/386, 898, 886, 200.18, 200.01; 375/377; 341/107; 326/38; 340/576; 342/70

[56] References Cited

U.S. PATENT DOCUMENTS

| | | | |
|---|---|---|---|
| 4,839,797 | 6/1989 | Katori et al. | 395/386 |
| 5,302,956 | 4/1994 | Asbury et al. | 342/70 |
| 5,381,145 | 1/1995 | Allen et al. | 341/107 |
| 5,384,497 | 1/1995 | Britton et al. | 326/44 |
| 5,394,031 | 2/1995 | Britton et al. | 326/38 |
| 5,425,062 | 6/1995 | Boop | 375/377 |
| 5,465,079 | 11/1995 | Bouchard et al. | 340/576 |
| 5,493,239 | 2/1996 | Zlotnick | 326/38 |
| 5,544,315 | 8/1996 | Lehfeldt et al. | 395/200.2 |

OTHER PUBLICATIONS

Heeb, et al, "Chameleon: A Workstation of a Different Colour," Field-Programmable Gate Arrays: Architectures and Tools for Rapid Prototyping. 2nd Intl. Workshop or Field-Programmable Logic and Applications. Vienna, Austria, 1992, pp. 152–161.

*Primary Examiner*—Kevin J. Teska
*Assistant Examiner*—Dan Fiul
*Attorney, Agent, or Firm*—Dirk Brinkman

[57] ABSTRACT

A field programmable gate array is configured to interface a source of externally produced input digital signals to a host computer system. The input signals having a first data type are reformatted to output digital signals having a second data type compatible with the computer system. The computer system can be used for storing and processing the output digital signals. The interface includes a first set of registers connected to the external source. The first set of registers store first portions of the input digital signals. A first buffer connected to the first set of registers store a combination of the first portions of the input digital signals, the combination of the first portions of the input digital signals stored in the first buffer formatted according to the second data type. The interface also includes a direct memory access controller to transport the combinations of the first portions of the input digital signals as output digital signals to the memory of the computer system.

21 Claims, 8 Drawing Sheets

CONFIGURABLE DIGITAL SIGNAL INTERFACE USING FIELD PROGRAMMABLE GATE ARRAY TO REFORMAT DATA

FIELD OF THE INVENTION

This invention relates generally to computer systems, and more particularly to reformatting externally produced digital signals for input to computer systems.

BACKGROUND OF THE INVENTION

In computer systems, it is a problem to interface and process externally produced digital signals, e.g. data, having a format or "data type" which does not conveniently map into the natural data types defined by the architecture of the computer systems.

For example, most modem general purpose computer systems and workstations store and process digital signals that are formatted fundamentally as eight bit bytes. The bytes are then further organized into 16, 32, or in more recent systems, 64 bit words. In addition, many specialized subsystems of computers are limited in their capabilities to store and process data formatted according to a single format, e.g., bytes.

In workstations used for displaying images, frame buffers are typically used to store the digital signals while they are processed for display. Conventional frame buffers expect the data or "pixels" representing the individual observable points of the image to be packed into eight bit bytes.

It is a problem to adapt externally produced image signals having a higher precision than eight bits to conventional frame buffers. For example, image acquisition systems may capture ten or twelve bits of information for each pixel. It is desired to process and display these images using, for example, conventional eight bit frame buffers, and yet retain full pixel precision for use in later off-line processing.

In the prior art, a simple solution is to reformat the captured pixel data using software. The raw images data, once acquired from an external source such as a camera, are stored in a memory. While stored in the memory, software programs process the ten or twelve bit pixels to be compatible with eight bit frame buffers. These operations are poorly adapted to software processing and consume a considerable amount of time. Software processing is not suitable for formatting image data which are continuously arriving at a rate of many million of bytes per second in real time. Hence, real-time processing of the images is hindered.

For example, in the field of astronomy, cameras having two dimensional charged coupled devices (CCD) for recording images have been used for many years. CCD image sensor technology provides high photon efficiency and rapid read-out capability. For many applications, especially while studying solar physics, it is extremely important to read high precision images of the CCD as fast as possible. High precision CCD equipped cameras can capture, for example, ten or twelve bits of gray scale pixel data.

After analog to digital conversion, data input rates to a processor of ten to thirty Megabytes per second (MBs) are common. Particular imaging applications such as frame selection, image scanning, and speckle techniques may require the processing of bursts of hundreds of images in a very short time.

CCDs of more recent design offer output data rates which can approach sixty MBs with twelve bit pixel resolution. However, wide deployment of high speed and high definition image acquisition systems is hindered by the lack of suitable interfacing equipment to conventional image processing systems such as workstations.

SUMMARY OF THE INVENTION

A field programmable gate array is configured to interface a source of externally produced input digital signals to a host computer system. The input signals having a first dam type are reformatted to output digital signals having a second data type. The format of the second data type being compatible with the format of the data structures of the host computer system.

The computer system can be used for storing and processing the output digital signals. The interface includes a first set of registers connected to the external source. The first set of registers store first portions of the input digital signals. A first buffer connected to the first set of registers store a combination of the first portions of the input digital signals. The combination of the first portions of the input digital signals stored in the first buffer formatted according to the second data type. The interface also includes a direct memory access controller to transport the combinations of the first portions of the input digital signals as output digital signals to the memory of the computer system.

DETAILED DESCRIPTION OF A PREFERRED EMBODIMENT

Figure 1:
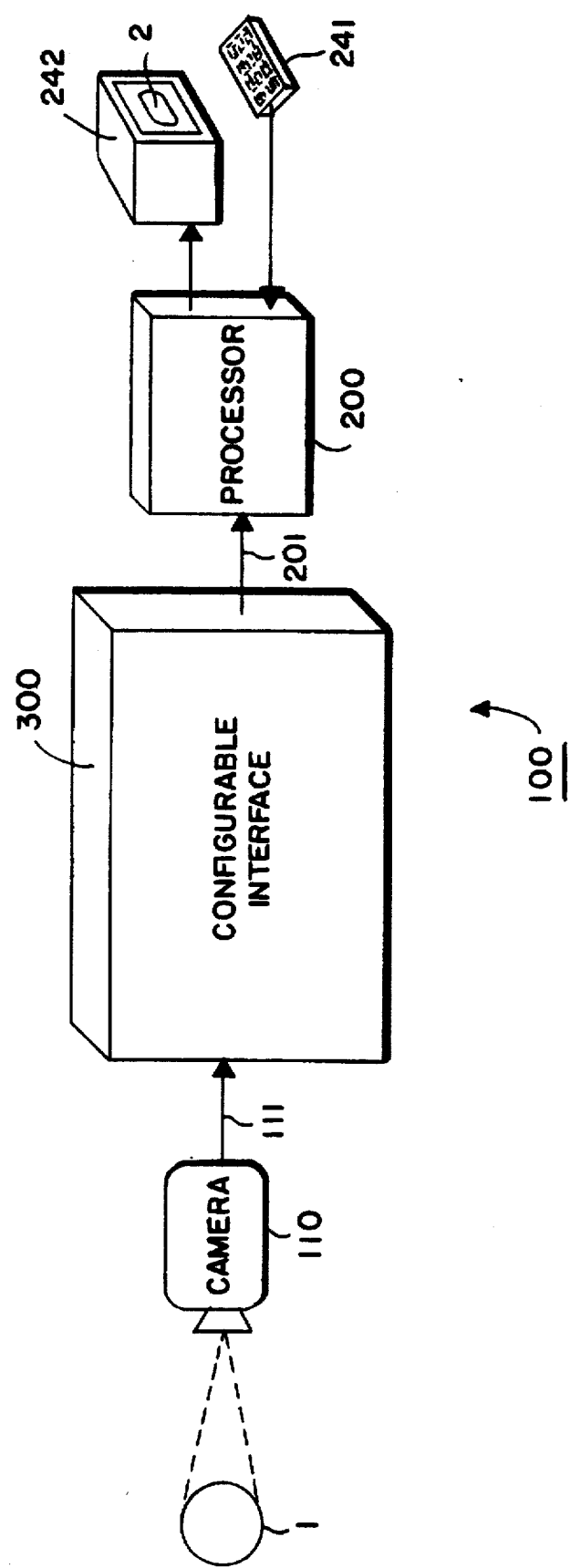
FIG. 1 is a block diagram of a system using a configurable interface according to the invention.

Now turning to FIG. 1, there is shown a system 100 for reformatting externally produced digital signals according to the invention. The system 100 includes a camera 110 externally connected to a processor 200 by a configurable interface 300. The processor 200 is connected to input and output (I/O) devices 241–242. The processor 200 can be in the form of a modern high performance workstation.

During operation of the system 100, images of objects, for example, the sun 1, are acquired by the camera 110 in the form of analog signals. The analog signals are converted to digital signals which are then stored and processed by the processor 200. User of the system 100 can manipulate the signals representing the images using the input device 241. The processed images 2 can be viewed on the output device 242.

The camera 110 can include a charged coupled device (CCD) having "pixels" arranged in a two-dimensional array. The array can have, for example, 1320×1035 8-bit pixels, 1534×1032 10-bit pixels, 757×242 12-bit pixels, and so forth. The rates at which the CCDs can be read can be expressed in tens of Megabytes per second (Mbs). This corresponds to frame rates of, depending on the pixel configurations, for example, 5 to 800 frames per second.

Figure 2:
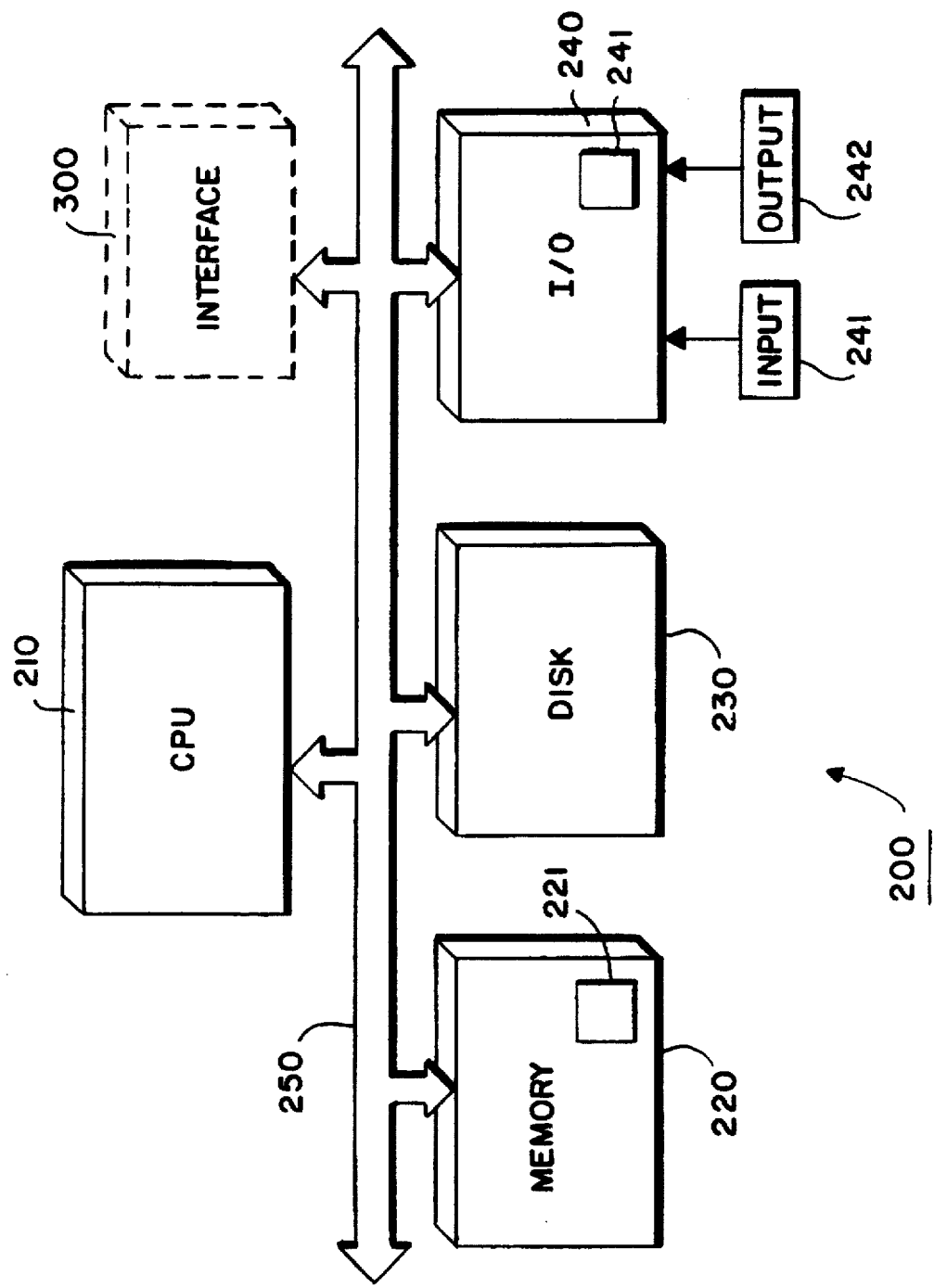
FIG. 2 is a block diagram of a processor used with the system of FIG. 1.

As shown in FIG. 2, the processor 200, generally conventional, includes a central processing unit (CPU) 210, a random access memory 220, a disk 230, and I/O controllers (I/O) 240 connected to each other by a processor bus 250. During operation of the processor 200, the CPU 210 executes instructions, e.g., software programs, which operate on digital signals, e.g., data. The instructions and data can be held static, e.g., stored in the memory 220. Instructions and data can be persistently stored on the disk 230 while the processor 200 is operating, or not. The I/O controllers 240 can be used to communicate data with the input and output devices 241–242. The bus 250 is used to transport timing, control, address, and data signals during operation of the processor 200.

A portion 221 of the memory 220, called an image buffer, can be dedicated to store pixel data, e.g., images, received from the camera 110. The image buffer 221 can be discontiguous physical memory pages of the memory 220 allocated by standard operating system procedures to be virtually contiguous. Application programs executing in the CPU 210 can manipulate the images stored in the image buffer 221 of the memory 220 on-line, as they are being received from the camera.

Image data being displayed on the output device 242 are maintained by a graphics adaptor, e.g. one of I/O controllers 240. The graphics adaptor can include a frame buffer 241 for storing pixels of a displayed image.

Typically, the signaling paths and storage components of the processor 200 have a fixed size "width" which is highly dependent on the architecture of the processor 200. Here, width means the number of bits which can be conveniently stored and processed by the components, e.g., CPU, memory, bus, etc., of the processor 200. For example, in modern processors, the width of the signaling paths typically is in power of two increments of eight bits, for example, 32, or 64 bit words. The widths of the signaling paths, in part, determine the data types of the data carried on the signaling paths.

As stated above, the width of the pixel signals can vary depending on the type of camera used with the system 100. It is a problem to provide a general purpose interface which can be used to connect cameras to the processor 200 to reformat the input digital signals, especially when the signaling rates are very high, e.g., tens of Megabytes per second.

Therefore, according to the principles of the invention, the interface 300 is made configurable so that cameras producing digital signals of various pixel widths can easily be adapted to the general purpose processor 200.

In a preferred embodiment of the invention, the interface 300 uses field programmable gate arrays (FPGA). FPGAs are well known. Typically, an FPGA includes a large internal configuration memory and can be operated in two modes. In a download mode, the configuration memory can be written, as a whole, using some eternal device, for example, the processor 200. Once configured, the FPGA behaves like a conventional application specific integrated circuit (ASIC).

In the present invention, the FPGA can receive input digital signals encoded according to an input format compatible with the camera. The FPGA produces output digital signals according to an output format compatible with the processor 200. In addition, the output signals can be stored in the memory 210 of the processor 200 without substantial attention of the processor 200 using, for example, direct memory accesses (DMA). In DMA, data signals are directly transported from a source to a destination with minimal utilization of processor resources.

Figure 3:
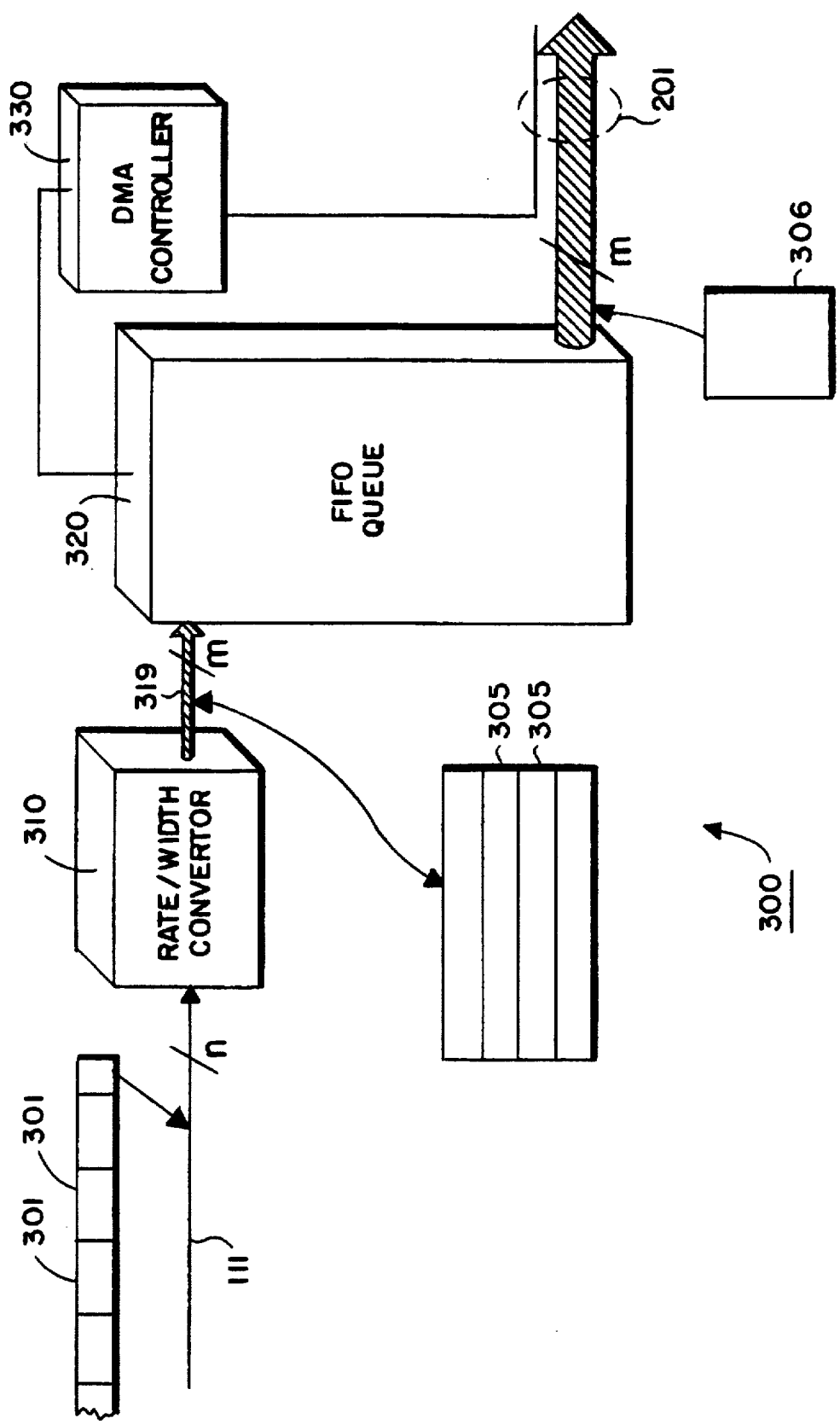
FIG. 3 is a block diagram of the configurable interface of FIG. 1 according to the invention.

As shown in FIG. 3, the configurable controller 300 includes a rate/width convertor 310, a first-in-first-out (FIFO) queue 320, and a DMA controller 330. The relative "width" of the signaling paths 111 and 201 is indicated by the notation "/n," and "/m."

During operation of the system 100, the controller 300 receives a steady stream of pixels signals 301 on line 111 from the camera 110. The rate at which the pixels are received is determined by timing signals generated by a conventional pixel clock. The pixel signals 301 are latched in the rate/width convertor 310. For example, if n is 12, and m is 32, 12 bit pixels 301 are received serially on line 111. The convertor 310 arranges the pixels 301 into, for example, a 32 bit transport word 305. Successive transport words 305 are collected in the FIFO queue 320.

Periodically, for example on a FIFO "full" condition, and under the direction of the DMA controller 330, the words 305 are transported to the image buffer 221 of the memory 220 of the processor 200 via interconnect 201 and bus 250 in bursts as packets 306. After processing, portions of the image buffer 221 can be displayed by storing the pixel data in the frame buffer 241.

Figure 4:
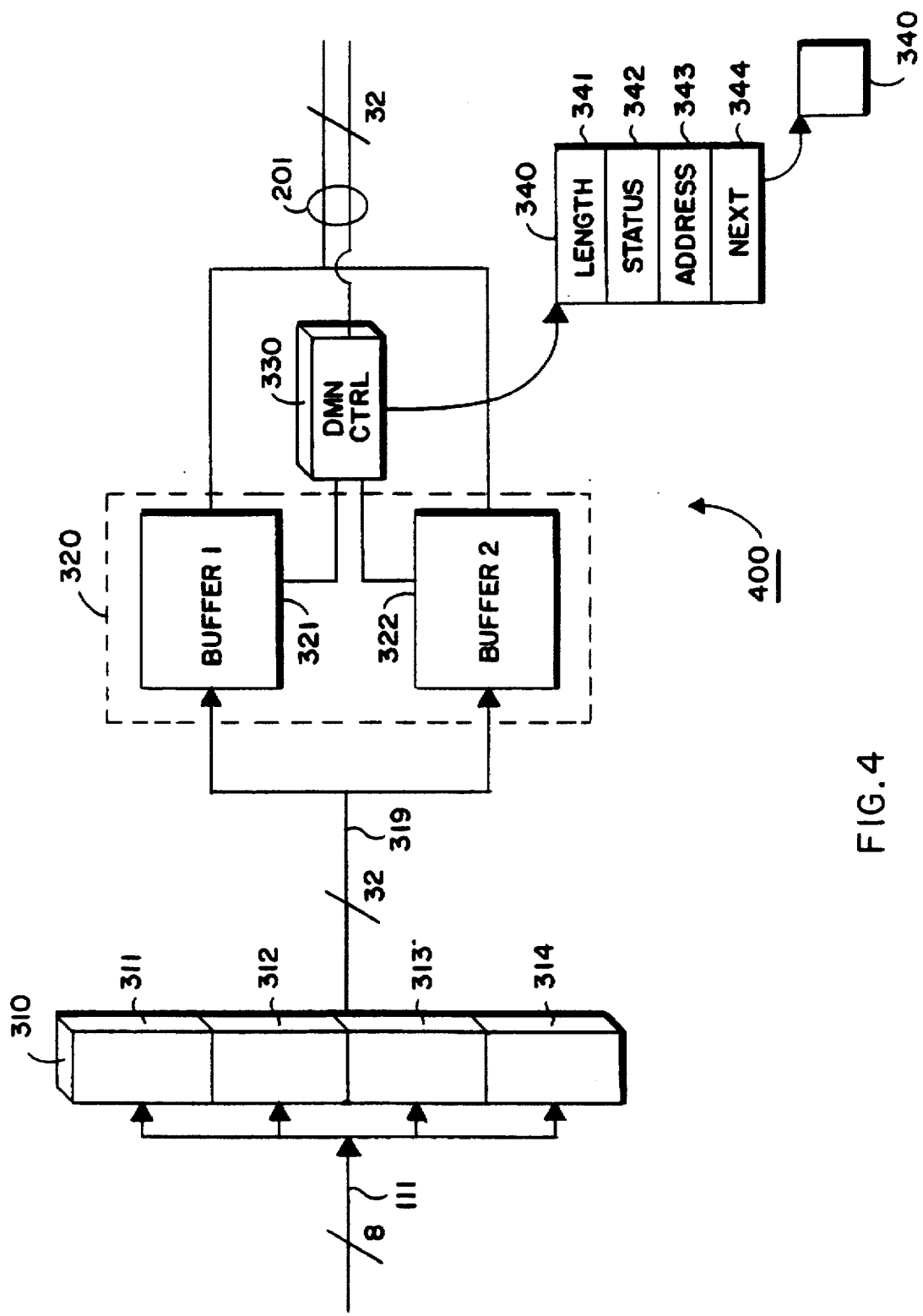
FIG. 4 is a block diagram of an exemplary configuration of the interface of FIG. 3.

FIG. 4 shows a configuration 400 of the interface for reformatting conventional eight bit pixels into thirty-two bit words. The FIFO queue 320 is equipped with double buffers 321–322. The buffers 321–322 are sized to store, for example, sixty-four words, each word being 32 bits. The convertor 310 is configured with four registers 311–314. The pixels 301, in groups of four, are received by the registers 311–314. The pixel bits are then transported in parallel as 32 bit words to the FIFO queue via line 319.

The buffers 321–322 of the queue 320 are organized in a double-buffer scheme. While one buffer is receiving pixel data from the convertor 310, the data of the other buffer is transporting packets 306 to the image buffer 221 of the memory 220.

The operation of the DMA controller 330 can be as follows. A list of commands blocks 340 is maintained. Each block 340 can include length, flag, address, and next fields 341–344. The length field 341 indicates the size of the transfer, the flag field 342 using, for example, bit fields, can indicate status information, such as buffer full, transferring, transfer complete, error, etc. The address field 343 can include the destination addresses for the data of the packet, for example, and address of one of the memory pages of the image buffer 241. If the list of command blocks is not contiguous, the next field 344 can store the address of the next command block in a linked list. The command blocks 340 can be considered an instruction stream for operating the DMA controller 330.

Figure 5:
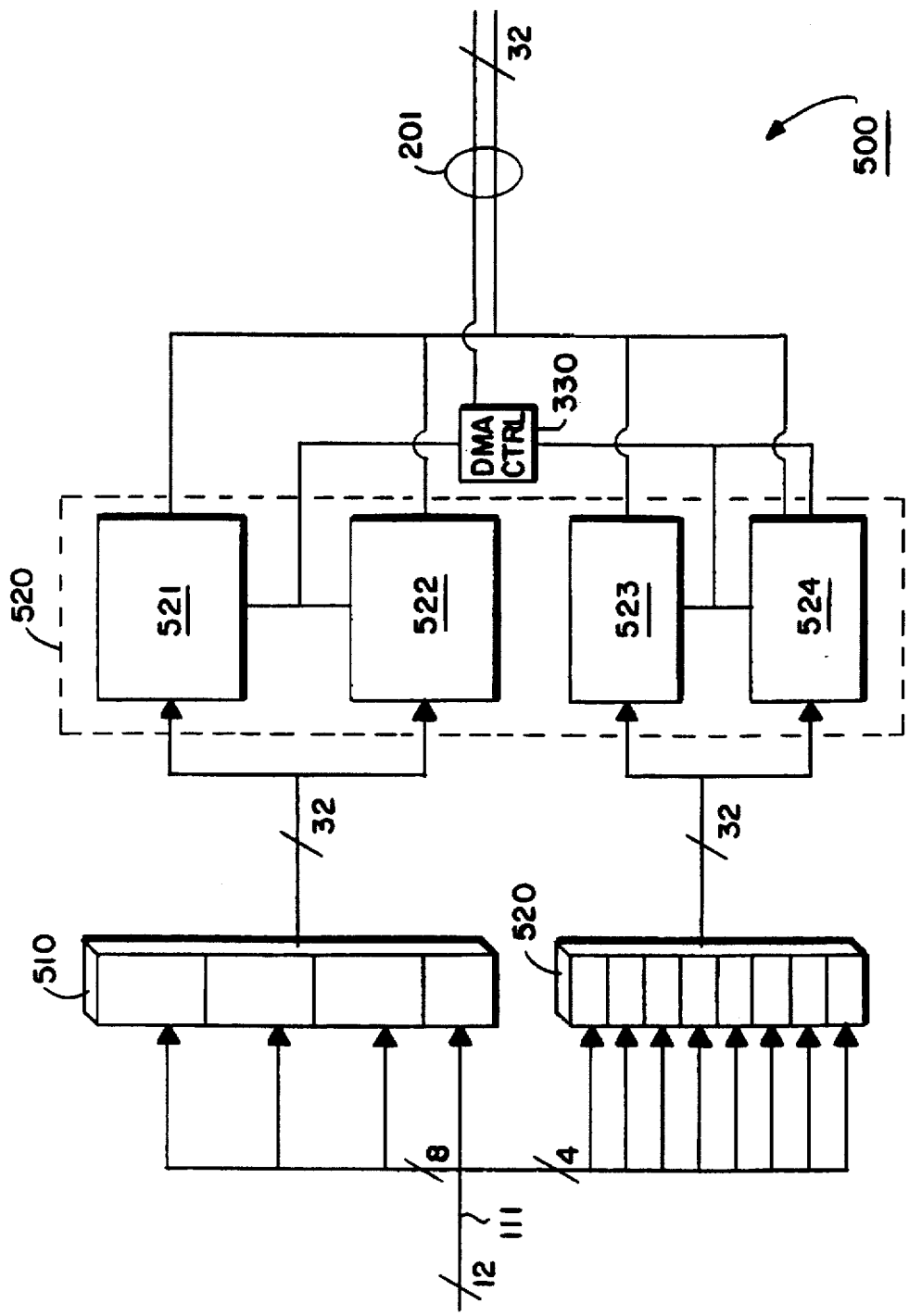
FIG. 5 is a block diagram of an alternative configuration of the interface.

FIG. 5 shows how the interface can be configured to reformat images using 12-bit pixels. Twelve-bit pixels do not conveniently pack into 8 bit bytes of conventional frame buffers, or for that matter, 32 or 64 bit words natural to many computer architectures.

With this configuration, portions of the 12 bit input pixel stream are separately processed in a first and second pixel stream transport channel. Each transport channel is used to format and communicate portions of the pixel data having different data types. For example, the first pixel stream transport channel carries the most significant portions of the input signals having a data type which can be expressed in eight bits. The second transport channel carries the least significant portions of the input signals which have a data type which can be expressed in four bits.

The most significant portions can be processed and viewed on-line as the data are generated by the camera 10. This means that the most significant portions are stored in the frame buffer 241 as eight bit values. The least significant portions can be stored elsewhere in the memory 220, and the least significant portions can be recombined with the most significant portions at a later time for off-line processing of full 12 bit high precision images.

For example, the interface 300 is configured to include an 8 bit convertor 510 in the first pixel stream transport channel, and a 4 bit convertor 520 in the second pixel stream transport channel. The 8 bit convertor 510 formats the most significant eight bits of the 12-bit pixels into four 8 bit registers to form 32 bit words. The 4 bit convertor 520 formats the least significant four bits into eight 4 bit registers, also to form 32 bit words.

In other words, the reformatting splits the "width" of the input pixels into two portions, each portion having a width which can be expressed as a different power of two number. The portions are then combined in power of two quantifies, so that the combination is compatible with a data type of the architecture of the processor 200.

The most significant portion of the images are queued in double buffers 521 and 522 of the first transport channel, and the least significant portions are queued in buffer 523 and 524 of the second transport channel. The double buffers 523 and 524 can be half the size, e.g., thirty-two words, of the buffers 521–522.

Figure 6:
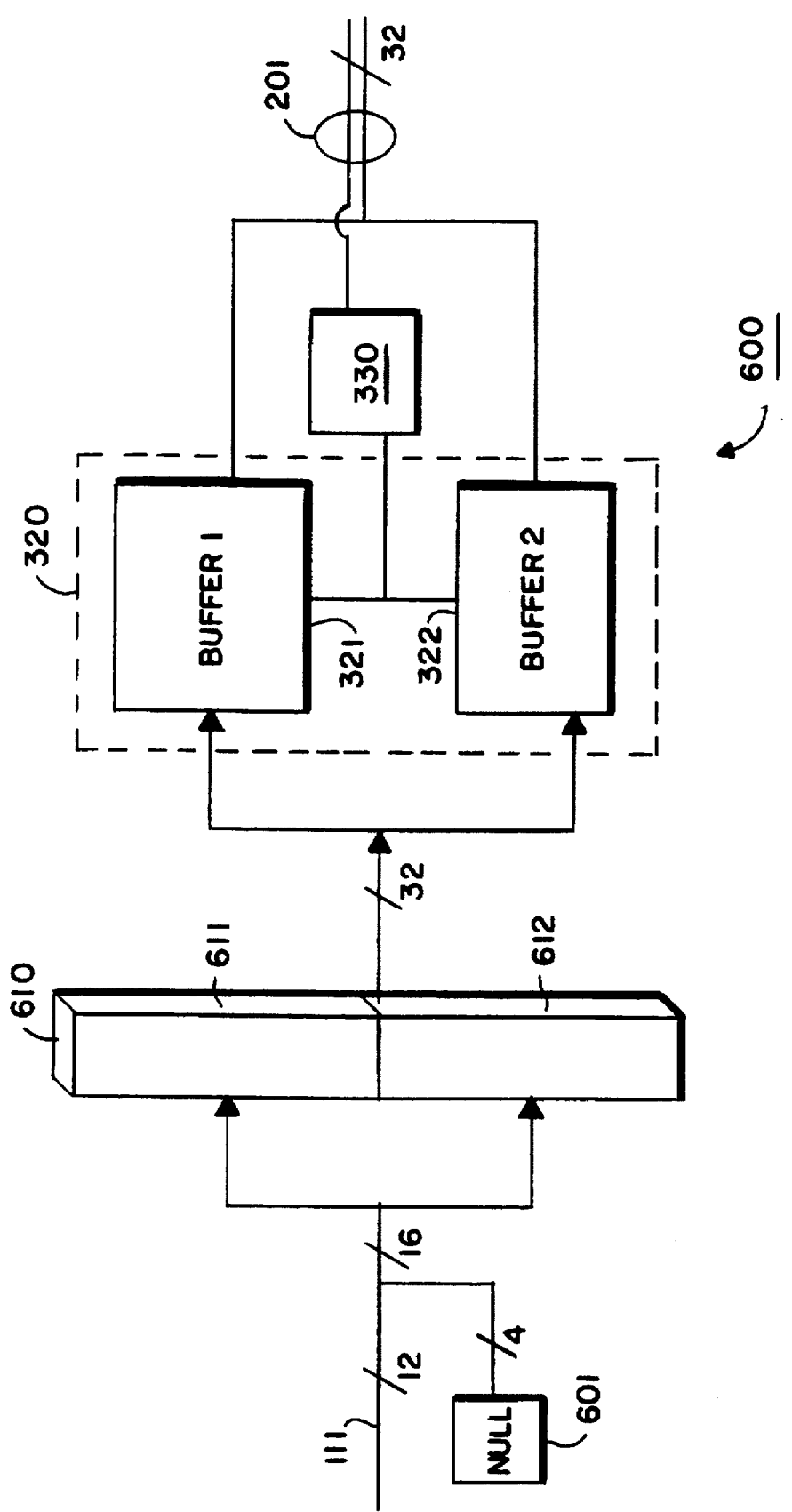
FIG. 6 is a block diagram of another configuration of the interface.

FIG. 6 shows a configuration 600 of the interface to format 12 bit pixels as complete images. Here a convertor 610 is configured to include two 16 bit registers 611 and 612. The interface 300 is also configured to include a null pixel generator 601. For every 12 bits of pixel data received on line 111, the convertor also receives four bits of "null" data, e.g. zeroes, from the null generator 601. The 12 and 4 bit streams are combined to produce two sixteen bit values to form the 32-bit words 305 for input to the buffer 321 and 322 of the FIFO queue 320.

This configuration allows for the on-line and in-place processing of complete images stored in the image buffer 221 of the memory 220. For example, it is possible m perform image operations such as adding images together. Since the original 12 bit pixel data are being manipulated as 16 bit quantities, addition of the 12 bit values within the 16 bit format can be performed in-place without concern for overflow.

Figure 7:
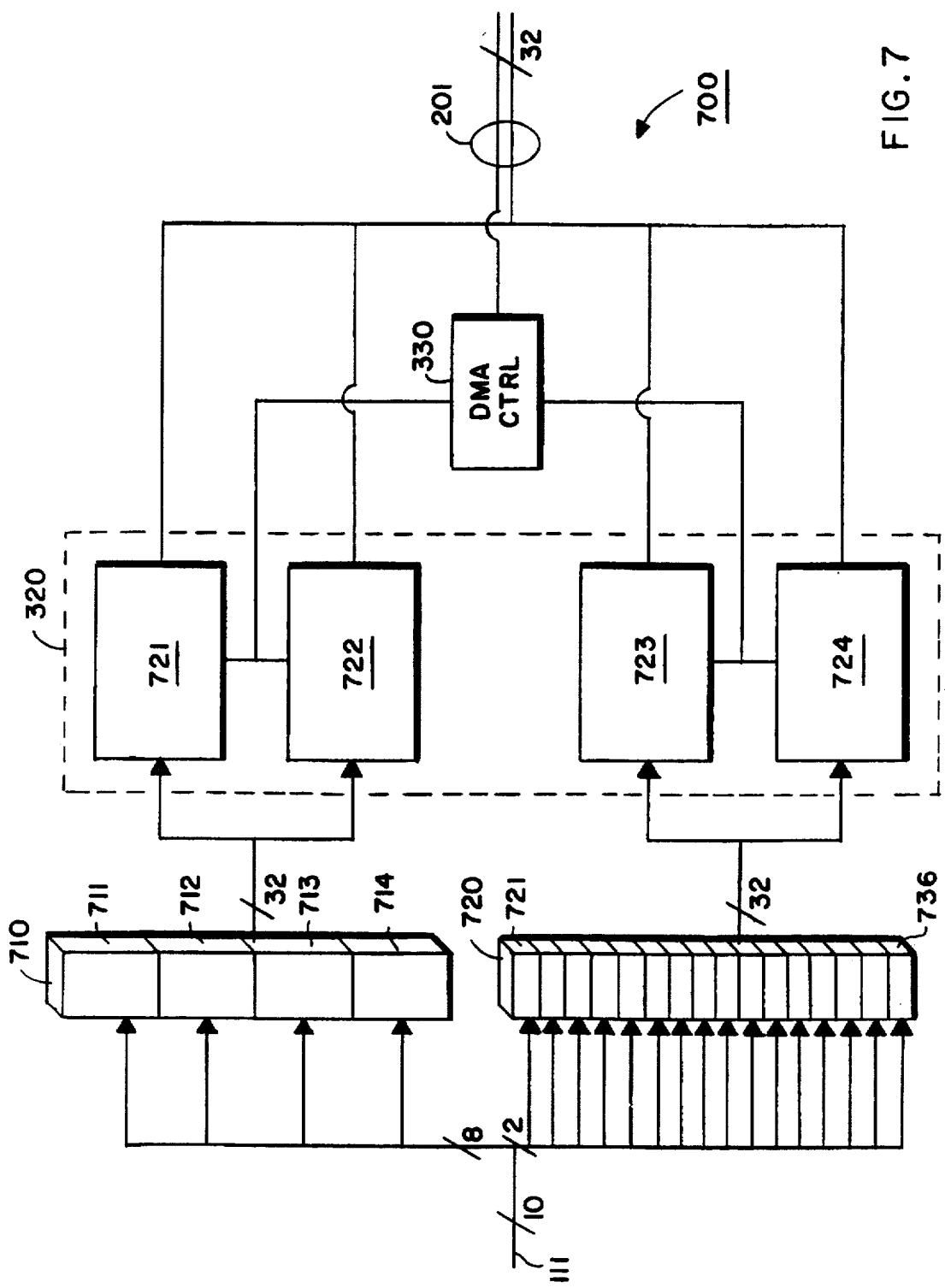
FIG. 7 is a block diagram of yet another configuration of the interface.

FIG. 7 shows how the interface 300 can be reconfigured to format 10 bit pixel data. In this configuration, the 10 bit input pixel stream is also split into two portions for transport along two different transport channels. In the first channel, the convertor 710 formats the most significant 8 bit portion of the pixels into four 8 bit registers 711–714 to produce 32 bit words for the buffers 721–722 of the queue 320.

The least significant 2 bit portion of the pixel data are formatted in sixteen 2 bit registers 721–736 of convertor 720 of the second transport channel. The output of the registers 721–736 are queued in the buffers 723–724. The most significant and least significant portions can be stored and processed as was described for FIG. 5.

It is also possible to reconfigured the interface 300 to format entire 10-bit images, by generating, in this case, six null bits, according to the scheme described for FIG. 6.

Figure 8:
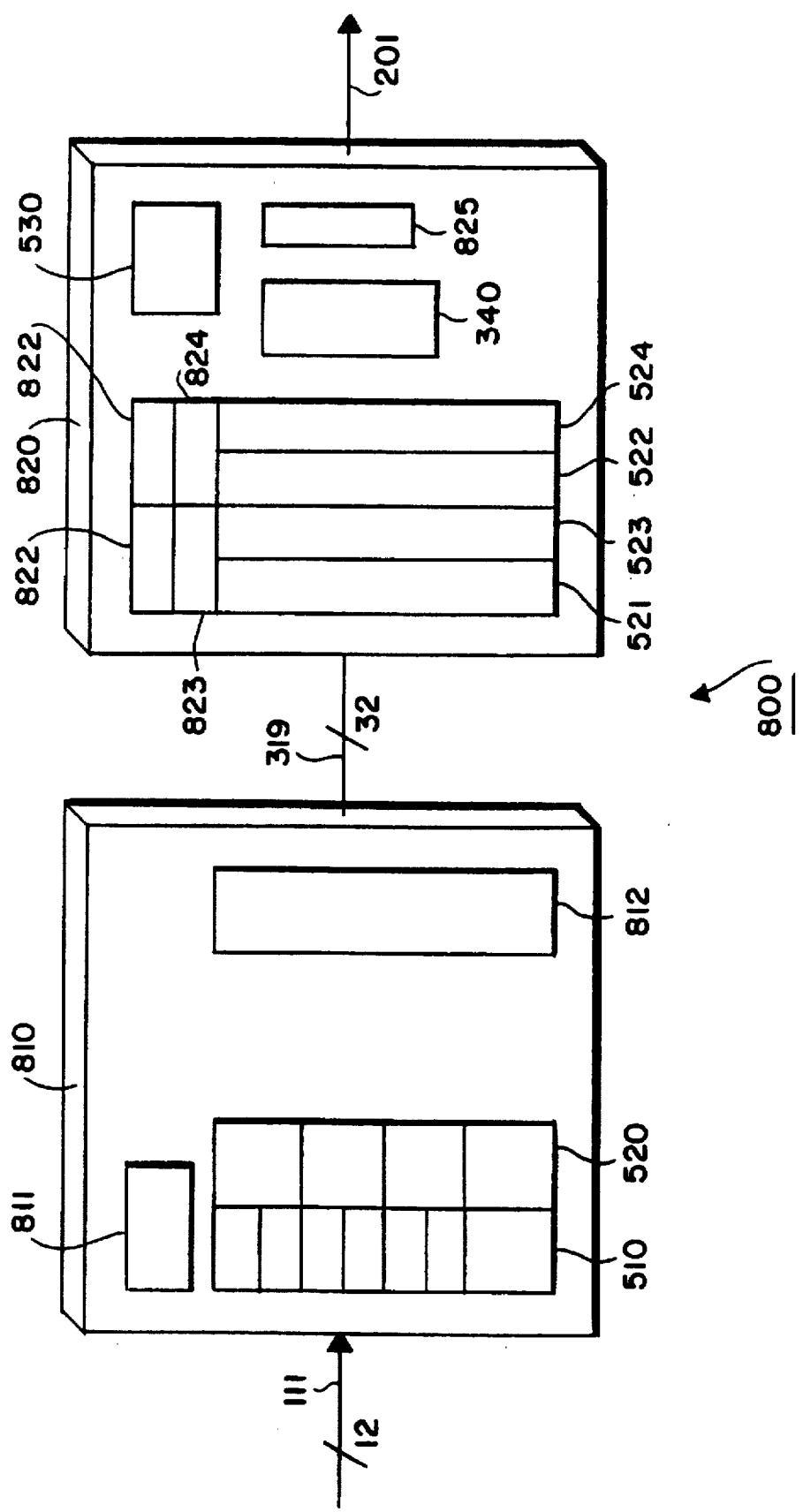
FIG. 8 is a floor plan of field programmable gate arrays configured as shown in FIG. 5.

FIG. 8 is a "floor-plan" of two FPGAs configured as the interface of FIG. 5. FPGA 810 is a Xilinx XC4003H, and FPGA 820 is Xilinx XC4010, both manufactured by Xilinx, Inc., San Jose, Calif. The FPGAs are primarily different in the number of programmable active bits (PABs) that form the regular mesh of primitive routing and logic blocks of the FPGAs 810 and 820.

The FPGA 810 implements the convertors 510 and 520, and also includes pixel packing control logic 811, and a 32 bit output buffer 812. The FPGA 820 implements the FIFO buffers 521–524, the DMA controller 530, and command control blocks 340. The FPGA also includes FIFO pointers 821 and 822, and FIFO control drivers 823 and 824. In addition, the FPGA 820 is configured to have a bus interface 825 for connecting to line 201.

The configurable formatter has been described with respect to use in visible light imaging systems. The images are presented as high bandwidth input digital signals, e.g., pixels, which can have various widths. The pixels are reformatted, in real time, to be compatible with conventional image processing systems, such as workstations having standard word lengths, and fixed width frame buffers. It should now be apparent that reformatting of pixels having widths other than 8, 10, or 12 is also possible. It is also possible to reformat pixels to word lengths other than 32 or 64 bits.

In another embodiment of the invention, the configurable reformatted can be used to reformat input digital signals externally produced by other sources and having other data types. For example, in many scientific applications, numeric information can be represented by digital signals in the form of floating-point numbers.

In digital format, a floating-point number, the base or radix of the numbers can be dynamically variable, or "floating" as the numbers are processed. Formats for representing the base and exponent of floating-point numbers are as numerous as extant specialized floating-point processors. The problem is to interface existing floating-point number generators, which may use compression and proprietary data types, to modem high speed floating processors which may require data types not considered in the design of the generator, for example, floating-point numbers formatted according to the IEEE standard.

For example, extant radar, sonar, or medical imaging equipment, e.g., MRI, may represent sampled data in a proprietary and compressed floating-point format. It is desired to interface this prior art equipment to a modern 64 bit workstation so that the data can be processed in real time. Here, the interface can be configured to receive compressed floating-point numbers in one format. The interface decompresses the numbers as they are received, and the numbers can then be reformatted to produce floating-point numbers in, for example, the standard IEEE format.

While the invention has been particularly shown and described with respect to specific embodiments thereof, it will be understood by those skilled in the art that changes in form and detail may be made therein without departing from the scope and spirit of the invention as set out in the claims.

I claim:

1. An apparatus for reformatting input signals to be compatible with a computer system, comprising:

a first set of combinations registers to store first portions of the input signals, each of the input signals having a first data type compatible with a source external to the computer system, being formed of a first portion combined with a second portion, and having a length different than a length of a second data type compatible with the computer system;

a first buffer to store a first combination of the first portions stored in the first set of registers, the first combination having the second data type; and a controller to control transport of the first combination as output signals from the first buffer to a memory of the computer system.

2. The apparatus of claim 1 further comprising:

a second set of registers to store the second portions of the input signals;

a second buffer to store a second combination of the second portions stored in the second set of registers, the second combination having the second data type;

wherein the controller is configured to control transport of the second combination as the output signals from the second buffer to the memory of the computer system.

3. The apparatus of claim 2 further comprising:

a first control command block to indicate a length, a status, and a destination address of the first combination.

4. The apparatus of claim 3 further comprising:

a second control command block to indicate a length, a status, and a destination address of the second combination.

5. The apparatus of claim 4 including means for filling the second buffer with the second combination while transporting the first combination from the first buffer.

6. The apparatus of claim 2 wherein the first data type has a length of ten bits, and the second data type has a length of eight.

7. The apparatus of claim 2 wherein the input signals are received while the output signals are transported.

8. The apparatus of claim 7 wherein the source is a CCD camera producing ten bit pixels as input signals, and the second data type formats signals as eight bit bytes.

9. An apparatus for reformatting input signals having an input data type compatible with a source of the input signals to be compatible with a computer system external to the source, comprising:

a first transport channel configured to transport first portions of the input signals, the first portions having a first output data type compatible with the computer system;

a second transport channel configured to transport second portions of the input signals, the second portions having a second output data type compatible with the computer system;

wherein, each of the input signals is formed of a first signal portion combined with a second signal portion, and has a length different than a length of a signal compatible with the computer system.

10. The apparatus of claim 9 wherein:

the first transport channel includes a first set of registers and a first buffer configured to store the first portions of the input signals, and the second transport channel includes a second set of registers and a second buffer configured to store the second portions of the input signals, and further comprising a controller to control transport of the first portions from the first buffer to a memory of the computer system and transport of the second portions from the second buffer to the memory of the computer system.

11. The apparatus of claim 10 wherein the input data type is expressed in ten bits, the first output data type is expressed in eight bits, and the second output data type is expressed in two bits.

12. The apparatus of claim 10 wherein the input data type is expressed in twelve bits, the first output data type is expressed in eight bits, and the second output data type is expressed in four bits.

13. A method for reformatting signals to be compatible with a computer system, comprising the steps of:

receiving input signals having an input data type compatible with a source of the input signals, the source of the input signals external to the computer system, transporting first portions of the input signals along a first transport channel, the first portions having a first output data type compatible with the computer system, transporting second portions of the input signals along a second transport channel, the second portions of the input signals having a second output data type compatible with the computer system;

wherein, each of the input signals is formed of a first signal portion combined with a second signal portion, and has a length different than a length of a signal compatible with the computer system.

14. An interface for reformatting input signals, each input signal having a first bit length, to be compatible with a computer system formatted to process words of a second bit length which is different than the first bit length, comprising:

a set of registers, each register in said set being configured to store a respective one of the input signals such that a total bit length of stored input signals in the set of registers equals the second bit length;

a first buffer configured to receive first stored input signals having the second bit length in parallel from the set of registers and to store the received first stored input signals;

a second buffer configured to receive second stored input signals having the second bit length in parallel from the set of registers and to store the received second stored input signals; and a controller configured to control the receipt of the first stored input signals by the first buffer and the second stored input signals by the second buffer, and to control transport of the received first stored input signals as output from the first buffer and the received second stored input signals as output from the second buffer to a memory of the computer system such that the transport of the received first stored input signals as output from the first buffer occurs simultaneous with receipt of the second stored input signals as input to the second buffer from the set of registers and the received first and the received second stored input signals are transported from the first and the second buffers as reformatted signals compatible with the computer system.

15. An interface according to claim 14, wherein the input signals are serial input signals and the second bit length is in a power of two increment of the first bit length.

16. An interface according to claim 14, further comprising:

a null generator for generating null input signals, each null input signal having a third bit length;

wherein each said register is configured to store the respective one of the input signals in combination with a respective one of the null input signals such that the total bit length of stored input signals in the set of registers equals the second bit length.

17. An interface for reformatting input signals, each input signal having a first bit length, to be compatible with a computer system formatted to process words of a second bit length which is different than the first bit length, comprising:

a first set of registers, each register within said first set being configured to store a first portion of a respective one of the input signals such that a total bit length of stored first portions in the first set of registers equals the second bit length;

a second set of registers, each register within said second set being configured to store a second portion of a respective one of the input signals, such that a total bit length of stored second portions in the second set of registers equals the second bit length;

a first buffer configured to receive the stored first portions in parallel from the first set of registers and to store the received first portions;

a second buffer configured to receive the stored second portions in parallel from the second set of registers and to store the received second portions; and a controller configured to control transport of the first portions as output from the first buffer to a memory of the computer system and transport of the second portions as output from the second buffer to the memory of the computer system, the transported first and second portions being reformatted signals compatible with the computer system.

18. An interface according to claim 17, wherein the input signals are serial input signals and the second bit length is in a power of two increment of the first bit length.

19. An interface according to claim 17, wherein each first portion has a third bit length and each second portion has a fourth bit length and only the first, the third and the fourth bit lengths are expressible as a power of two number.

20. An interface according to claim 17, wherein the first set of registers includes a first number of registers and the second set of registers includes a second number of registers different than the first number of registers.

21. A field programmable gate array for reformatting input signals, each input signal having a first bit length, to be compatible with a computer system formatted to process words of a second bit length which is different than the first bit length, comprising:

a set of registers, each register being selectively configurable to store (i), in a first programmed configuration, a respective one of the input signals such that a total bit length of stored input signals in the set of registers equals the second bit length and (ii) in a second programmed configuration, only a portion of a respective one of the input signals such that a total bit length of stored portions in the set of registers equals the second bit length, and thereby reformat the input signals to be compatible with the computer system;

a first buffer configurable to (i), in the first programmed configuration, receive first stored input signals having the second bit length in parallel from the set of registers and to store the first stored input signals and (ii), in the second programmed configuration, to receive the stored first portions in parallel from the set of registers and to store the received first portions;

a second buffer configurable (i), in the first programmed configuration, to receive second stored input signals having the second bit length in parallel from the set of registers and to store the second stored input signals and (ii), in the second programmed configuration, to receive second portions of the input signals from a second set of registers and to store the received second portions; and a controller configurable to control (i), in the a first programmed configuration, transport of the first stored input signals as output from the first buffer to a memory of the computer system and to control simultaneous receipt of the second stored input signals as input to the second buffer from the set of registers and (ii), in the second programmed configuration, transport of the first portions as output from the first buffer to the memory of the computer system and transport of the second portions as output from the second buffer to the memory of the computer system.

* * * * *